United States Patent
Garvey

[15] 3,688,378
[45] Sept. 5, 1972

[54] SOIL PIPE ASSEMBLY TOOL

[72] Inventor: Jerry W. Garvey, 2331 E. Evergreen Drive, Appleton, Wis. 54911

[22] Filed: June 22, 1970

[21] Appl. No.: 48,277

[52] U.S. Cl. .................................................29/237
[51] Int. Cl. ...........................................B23p 19/04
[58] Field of Search ...29/280, 282, 237; 254/29, 131

[56] References Cited

UNITED STATES PATENTS

| | | | |
|---|---|---|---|
| 2,719,695 | 10/1955 | McKee | 29/237 |
| 3,483,608 | 12/1969 | Madden | 29/237 |
| 3,571,896 | 3/1971 | Wilkerson | 29/237 |
| 3,096,572 | 7/1963 | Simmons | 29/282 X |
| 3,181,234 | 5/1965 | Gill | 29/237 |
| 809,910 | 1/1906 | DeLay | 254/29 |

Primary Examiner—Robert C. Riordan
Assistant Examiner—J. C. Peters
Attorney—Andrus, Sceales, Starke & Sawall

[57] ABSTRACT

A tool for assembling an disassembling soil pipes having telescoping bell and spigot type joints employing a resilient gasket type of seal and lock. The tool includes a yoke for embracing the pipe having the bell end and for being placed in abutment with the bell end. An operating lever having a bifurcated end is pivotally mounted on the yoke. A chain is fastened around the second pipe adjacent the spigot end and hooked to the operating handle so that by pivoting the operating lever on the yoke, the pipes may be assembled by pulling the spigot end of one pipe into the bell end of the other pipe. For disassembly of the pipes, a strut may be linked between the operating lever and the pipe having the spigot end so as to remove the spigot end from the bell end upon pivotal movement of the operating lever.

1 Claim, 3 Drawing Figures

PATENTED SEP 5 1972

3,688,378

INVENTOR.
Jerry W. Garvey

BY Andrus, Sceales, Starke & Sawall

Attorneys

SOIL PIPE ASSEMBLY TOOL

BACKGROUND OF THE INVENTION

The present invention relates in assembling and disassembling apparatus for effecting couplings to conduits.

The bell and spigot or hub and ball type of joint is commonly found in cast iron pipe, usually termed soil pipe. In the past, such pipe has been assembled into fluid carrying lines by inserting the spigot end of one pipe into the bell end of another pipe, caulking the space between the bell and spigot ends with oakum, and then pouring molten lead on top of the oakum to complete the joint. The many disadvantages of the caulked and leaded joint, especially its high cost and the time, labor and equipment required to complete the joint has led to a search for a better way of providing fluid tight, mechanically rigid seals between soil pipes. With the development of improved resilient materials, such as synthetic rubber and the like, the use of an annular resilient gasket interposed between the bell and spigot ends of the pipes has been devised and has met with plumbing code approval.

In assembling bell and spigot joints with such gaskets, the gasket is installed within the bell end of one pipe and its interior surface is lubricated. The spigot end of the second pipe is aligned with the first pipe and the spigot end inserted in the bell end. Because of the nature of the gasket seal and the variations in dimensions of the cast iron soil pipe, insertion of the spigot end into the gasket contained in the bell end requires a mechanical device capable of exerting considerable force along the axis of the pipes. A similar, but oppositely directed, force must be applied to the pipes to disassemble them.

For the foregoing reasons, numerous devices have been developed to effectuate the assembly and disassembly of resilient gasket type joints in soil pipe. However, such heretofore known devices have generally suffered from a complexity which has complicated their use, increased their weight and manufacturing cost, lengthened the time necessary to make or disassemble a joint, and lessened their ability to withstand the rough usage such devices receive in the field.

It is, therefore, the object of the present invention to provide an improved soil pipe assembly tool which is mechanically simpler than those heretofore developed and which is therefore capable of providing substantially trouble free service for substantial periods of time. The manufacturing cost of the tool is considerably less than that of prior art tools. The improved soil pipe assembly tool is capable of assembling and disassembling soil pipes in a markedly shorter time then has heretofore been obtainable. The tool is suitable for use on a wide range of pipe sizes with minor modification and is light in weight.

These and other objects of the present invention will become apparent as the description of the invention proceeds.

DESCRIPTION OF THE PREFERRED EMBODIMENT

Figure 1:
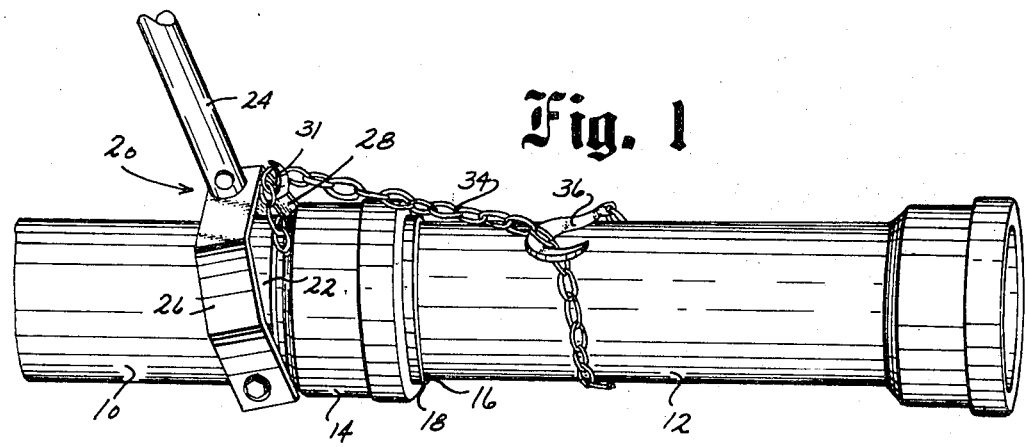
FIG. 1 is a perspective view of the soil pipe assembly tool of the present invention showing the elements of the tool and the manner in which it is used to effect assembly of soil pipes.

Turning now to FIG. 1 there is shown therein a first soil pipe 10 and second soil pipe 12. Soil pipe 10 includes bell end 14 in which is insertable spigot end 16 of soil pipe 12. The joint between bell end 14 and spigot end 16 is sealed by a resilient gasket 18.

Figure 3:
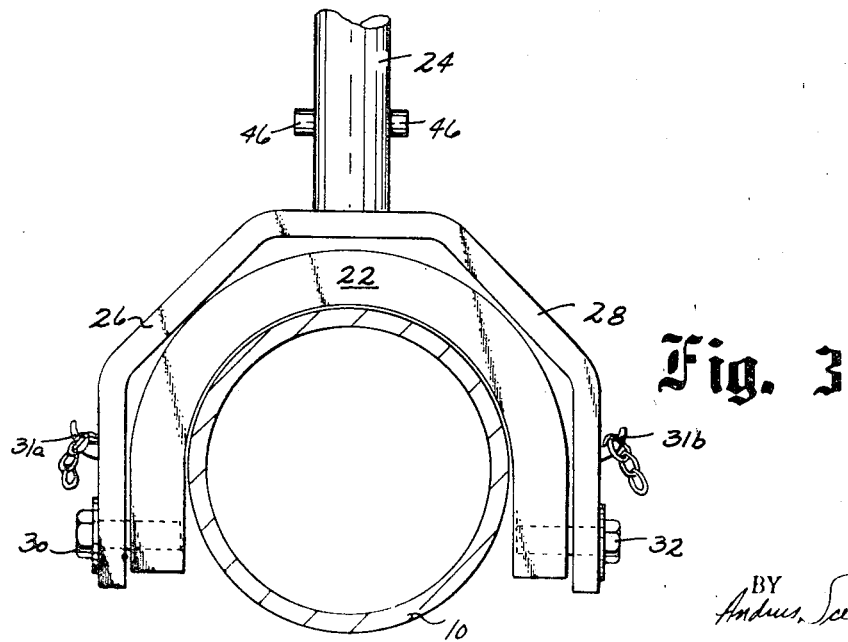
FIG. 3 is a front elevation of the yoke and operating lever portions of the soil pipe assembly tool, showing a modification thereof.

Soil pipe assembly tool 20 includes yoke 22, as seen most clearly in FIG. 3. The yoke 22 partially surrounds and embraces first soil pipe 10 so that the yoke is in abutment with bell end 14 to anchor yoke 22 against movement along soil pipe 10 in a direction toward second soil pipe 12.

An operating lever 24 has on one ends parallel arms 26 and 28 providing a lever bow which straddles yoke 22. The end of arms 26 and 28 are pivotally connected to the extremities of yoke 22 by a means, such as machine screws 30 and 32, passing through the arms and extremities of yoke 22. By positioning the rotative axis of screws 30 and 32 in the extremities of yoke 22, any pull transmitted to yoke 22 from lever 24 through screws 30 and 32 in a direction axially of the pipe will tend to hold yoke 22 more firmly in place on pipe 10.

The size of yoke 22 is selected so that the yoke fits snugly around the soil pipe. To accommodate various sizes of soil pipe, an appropriately proportioned yoke and operating lever assembly may be provided for each pipe size. In the alternative, an appropriately sized yoke 22 may be selected and placed in operating lever 24 by loosening screws 30 and 32, removing the previous yoke, inserting the desired yoke and retightening screws 30 and 32. Spacers may be placed on screws 30 and 32 when using smaller sized yokes or may be integrally mounted on the smaller sized yokes.

As shown in FIG. 1, a hook 31 is mounted on operating lever 24 at the juncture of arms 26 and 28 so that the hook is moved axially along the pipe in a shallow arc as operating handle 24 is pivoted on yoke 22. A flexible member, such as a length of chain 34, has a hook 36, or other means for forming a loop therein, at one end thereof.

IN assembling first soil pipe 10 and second soil pipe 12, gasket 18 is inserted into bell end 14 of first soil pipe 10 and lubricated. First soil pipe 10 and second soil pipe 12 are then brought carefully into alignment with spigot end 16 touching gasket 18. Chain 34 is then wrapped around second soil pipe 12 adjacent spigot end 16 and secured by hook 36 to engage second soil pipe 12. It has been found desirable to place the wrap of chain 34 and hook 36 at least 12 inches from spigot end 16. Yoke 22 is placed over first soil pipe 10 adjacent bell end 14. Hook 31 is above bell end 14. Operating lever 24 is pivoted on yoke 22 in the direction toward second soil pipe 12, i.e. toward the right as shown in FIG 1. Chain 34 is pulled taut and secured to operating lever 24 by dropping the appropriate link of the chain into hook 31.

To accomplish assembly of first soil pipe 10 and second soil pipe 12, operating lever 24 is pivoted toward first soil pipe 10 or to the left as shown in FIG. 1 causing hook 31 to move in the same direction. Chain 34 coupled to hook 31 pulls spigot end 16 into gasket 18 effecting the sealing and joinder of first soil pipe 10 and second soil pipe 12.

While chain 34 exerts a slight radial force on second soil pipe 12 during assembly, it has been found that if the pipes are properly aligned prior to assembly, this slight radial force does not interfere with the assembly operation or cause misalignment of the pipes. The amount of radial force exerted on the pipes may be reduced by controlling the amount of pivotal movement of operating lever 24 and the length of chain 34.

In the event one pivotal movement or stroke of operating lever 24 is insufficient to pull spigot end 16 completely into gasket 18, operating lever 24 may be returned to the initial position. Chain 34 is then slid along second soil pipe 12 away from spigot end 16 until the chain is taut and the pivotal movement of operating lever 24 toward first soil pipe 10 repeated to further move spigot end 16 into the gasket 18. This operation may be repeated as many times as is necessary as to assemble the two soil pipes.

In some cases it may be advantageous to place hook 36 on the side or bottom of spigot end 16 when wrapping chain 34 around second soil pipe 12. This causes second soil pipe 12 to be rotated during insertion into bell end 14, facilitating the assembly operation.

FIG. 4 shows a modification of soil pipe assembly tool 20 which has been found useful in assembling large diameter soil pipe. Instead of a single hook 31, two hooks are used, one of which is mounted on each of the arms 26 and 28. Hook 31a is shown as mounted on arm 26 while hook 31b is shown as mounted on arm 28. Two chains 34 are utilized one of which is wrapped around second soil pipe 12 and fastened to hook 31a, the other of which is wrapped around second soil pipe 12 and fastened to hook 31b. The assembly of the soil pipes using the embodiment of the invention shown in FIG. 3 proceeds as described above in connection with the embodiment of soil pipe assembly tool 20 shown in FIG. 1.

To effect disassembly of second soil pipe 12 from first soil pipe 10 by removing spigot end 16 from gasket 18, chain 34 is not used. Tool 20 is placed on second soil pipe 12 in front of gasket 18 and is oriented so that hook 31 points toward bell end 14 of first soil pipe 10.

A strut or bar 38 has a transverse plate 40 mounted at one end thereof. Hook 42 is connected to one side of plate 40 while one end of chain 44 is connected to the other side of plate 40. The bight of chain 44 is insertable in hook 42 to form a loop for engaging second soil pipe 12.

The other end of strut 38 is engagable with operating lever 24 at or near the juncture of arms 26 and 28. For this purpose, the other end of strut 38 is bifurcated so as to partially surround operating lever 24 at the juncture or arms 26 and 28. To retain strut 38 at the desired point on operating lever 24, pins 46 extend outwardly therefrom to obstruct movement of the bifurcated end of strut 38 upwardly along operating lever 24.

Figure 2:
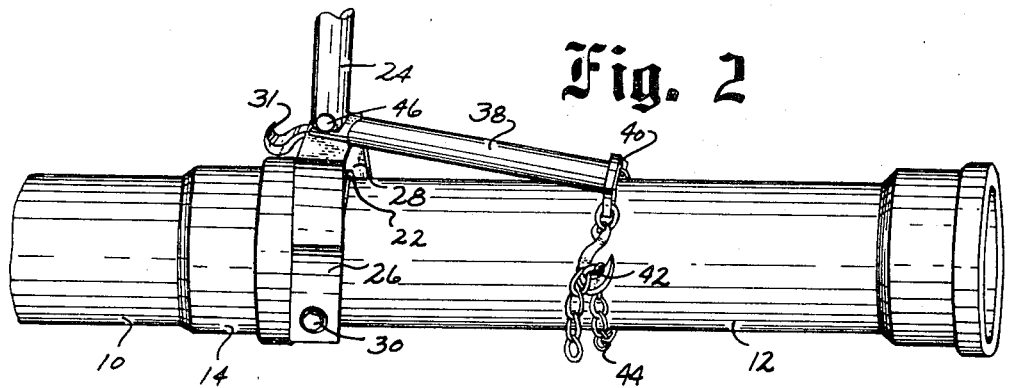
FIG. 2 is a perspective view of the soil pipe assembly tool of the present invention showing additional elements of the tool and the manner in which the tool is used to effect disassembly of soil pipes.

To disassemble first soil pipe 10 and second soil pipe 12, operating lever 24 is pivoted on yoke 22 in the direction toward first soil pipe 10, that is, to the left as shown in FIG. 2. The bifurcated end of strut 38 is placed in engagement with operating lever 24 at the juncture of arms 26 and 28 and beneath pins 46. Chain 44 is wrapped around second soil pipe 12 and the appropriate link of the chain placed in hook 42 to secure second soil pipe 12 to strut 38.

Operating lever 24 is then pivoted toward second soil pipe 12, moving strut 38 and second soil pipe 12 secured thereto in a direction to extract spigot end 16 from gasket 18.

In the event one stroke of operating lever 24 is insufficient to separate the two soil pipes, operating lever 24 may be returned to the initial position. Chain 44 and strut 38 are then slid along second soil pipe 12 toward spigot end 16 until the bifurcated end of strut 38 again engages in operating lever 24 and the pivotal movement of operating lever 24 toward second soil pipe 12 repeated. The operation may be repeated as many times as is necessary to disassemble soil pipes 10 and 12.

Various modes of carrying out the invention are contemplated as being within the scope of the following claims particularly pointing out and distinctly claiming the subject matter which is regarded as the invention.

We claim:

1. A tool for providing axial movement between a first pipe having a bell end and a second pipe having a spigot end insertable in the bell end, said tool comprising:

a yoke for embracing a selected one of the first and second pipes in abutment with the bell end of the first pipe for preventing the movement of said tool in one direction along the pipes;

an operating lever having a bifurcated end providing arms which are disposed over said yoke, the ends of said arms being pivotally mounted to the extremities of said yoke; and a strut having means for engaging the second pipe adjacent the spigot end mounted on a first end thereof, said strut having a bifurcated second end partially surrounding said operating lever adjacent the juncture of said yoke arms for providing axial movement to the strut along the second pipe when said operating lever is pivoted on said yoke for removing the spigot end of the second pipe from the bell end of the first pipe, said operating lever including pins extending from said operating lever adjacent the juncture of said yoke arms for retaining the second end of said strut in engagement with said operating lever between said pins and the juncture of said arms.

* * * * *